Figure 2:
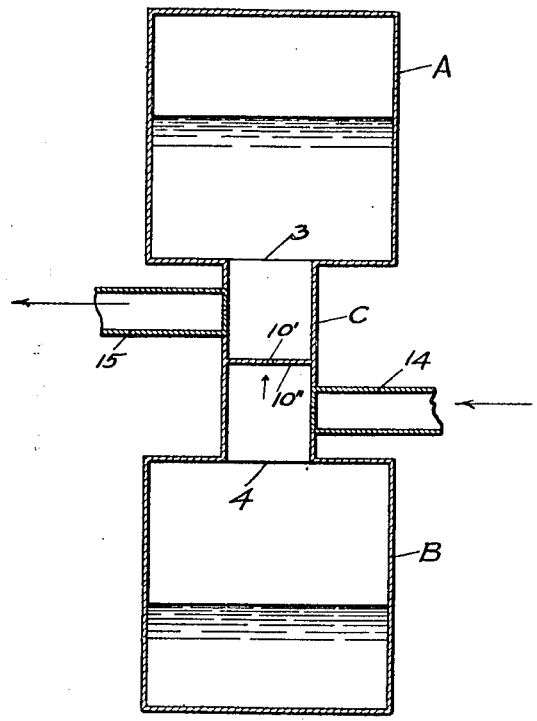

E. G. HOPSON.
VOLUMETER.
APPLICATION FILED JULY 13, 1915.
1,207,045.
Patented Dec. 5, 1916.
2 SHEETS—SHEET 1.
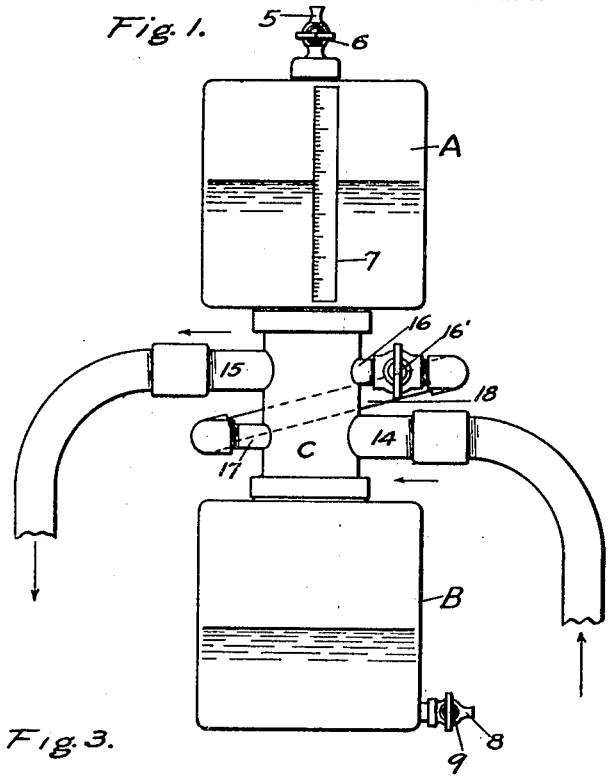
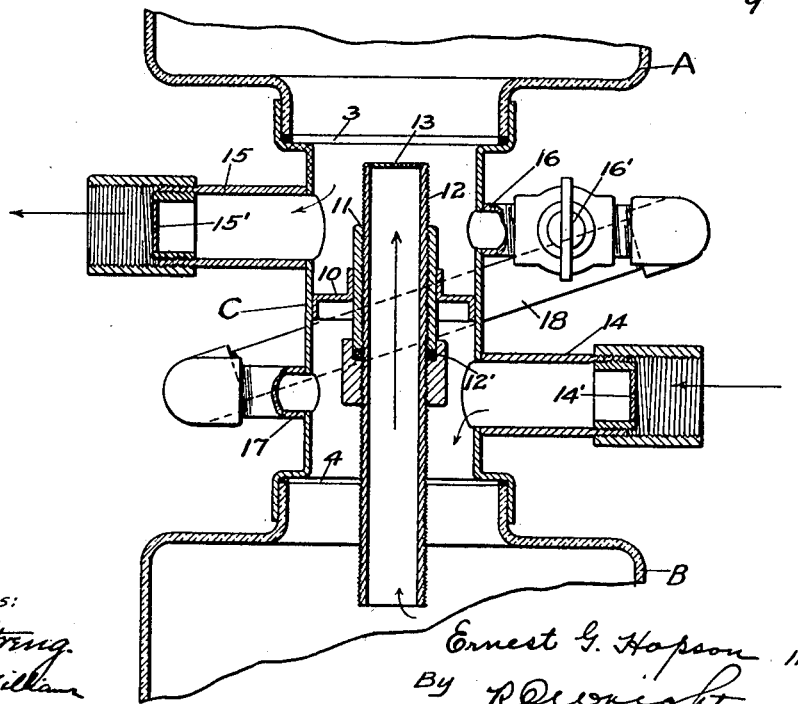
Witnesses:
Ernest G. Hopson, Inventor,
By R. C. Wright
Atty.

E. G. HOPSON.
VOLUMETER.
APPLICATION FILED JULY 13, 1915.

1,207,045.

Patented Dec. 5, 1916.
2 SHEETS—SHEET 2.

UNITED STATES PATENT OFFICE.

ERNEST G. HOPSON, OF PORTLAND, OREGON.

VOLUMETER.

1,207,045.   Specification of Letters Patent.   Patented Dec. 5, 1916.

Application filed July 13, 1915. Serial No. 39,595.

*To all whom it may concern:*

Be it known that I, ERNEST G. HOPSON, a citizen of the United States, residing at Portland, in the county of Multnomah and State of Oregon, have invented a new and useful Improvement in Volumeters, of which the following is a specification, reference being had to the accompanying drawings.

My invention relates to that class of devices which are used for measuring the quantity of flow of a fluid.

The object of my device is to provide a volumeter wherein a known proportionate part of the flow of a fluid can be segregated and the same determined as a basis for computing the volume of said flow. I attain these objects, as well as other advantages, by the construction, combination and arrangement of parts illustrated in the accompanying drawings which form a part hereof.

Figure 1 is a side elevation of the device. Fig. 2 is a vertical sectional view of the same with some parts omitted and showing a fixed diaphragm and orifice within the connection. Fig. 3 is a vertical sectional view of the device shown in Fig. 1 and exhibiting all parts thereof, excepting parts of the upper and lower containers broken away.

Like letters and numerals refer to like parts in all views.

A is an upper container.

B is a lower container.

C is a vertical connection between the two containers, the upper one having an opening 3 in its bottom into the connection, the lower one an upper opening 4 into the connection. The container A has a vent 5 provided with a stop-cock 6. On this container is a vertical gage 7. The container B has a vent 8 near its lower end provided with a stop-cock 9.

Within the connection C is a transverse diaphragm 10. This diaphragm has either a fixed orifice 10' as shown in Fig. 2 or the orifice may be vertically adjustable as shown by the arrangement in Fig. 3. In the latter form the diaphragm 10 has a threaded opening 11 therein. A vertical pipe 12, having an exterior thread, is arranged within the opening 11. The pipe 12 is open at its lower end and has only a small orifice 13, of predetermined size, in its upper end.

A rubber gasket 12' is placed about the pipe 12 to prevent leakage of fluid around it. The connection C has an influent pipe 14 below the diaphragm 10 and an effluent pipe 15 above the diaphragm. The influent 14 has a small entrant orifice 14' therein and the effluent has a small discharge orifice 15' therein. The connection C also has an outlet 16 above its diaphragm 10, provided with a stop-cock 16' and an inlet 17 below the diaphragm. The said outlet 16 and inlet 17 are connected outside the connection C by a pipe 18. The containers may be of glass or metal as desired.

It will first be seen that the device as shown in Fig. 2 is the simple or elemental form thereof, with the orifice 10', corresponding to the orifice 13 in the pipe 12, formed in a diaphragm 10'' of rigid position determined at the time of construction. The other form shown in Fig. 3 represents the orifice in an adjustable pipe. It will therefore be understood that the same principle is embodied in both forms. I will therefore continue herein with respect to the form shown in Fig. 3, for the purpose of an ample demonstration.

It will now be seen that when my device is installed in position to receive a portion of the flow of the fluid to be measured, for example through the influent pipe 14, the container B is empty or partly empty of the particular fluid to be measured. In our illustration I am showing the measurement of water and using oil as the correlative fluid. This latter must in all cases be of different specific gravity from the fluid to be measured. The sizes of the orifices 13—14'—15' depend upon the sizes of the containers. The pipe 12 is adjustable vertically, for the reason that the distance between the horizontal planes in which the orifices 13 and 14' are positioned is correlated with the pressure exerted by the influent fluid passing through the pipe 14 upon the fluid of different specific gravity in the container B. It is by this means I secure differential pressures above and below the orifice 13 to compensate for frictional resistance of fluids passing through the device in order that it will segregate a constant proportional part of the fluid to be measured at all stages of flow. As illustrated we therefore have the effluent passing outwardly into water being measured and the influent arranged as stated before. Oil is in the upper part of the container B. We will first assume that there is no flow, and therefore no velocity head in the water to be measured. Let us further assume that static pressure of water is communicated to container B through the influent pipe 14 and the influent orifice 14' and to container A through the effluent pipe 15 and the effluent orifice 15'. This static pressure, thus communicated through the oil in container B and the water in container A is balanced above and below the orifice 13 and no flow through orifice 13 results.

We will now assume that the water to be measured begins to flow and that the influent pipe 14 is so connected with the flowing water that the head or pressure due to the velocity of flow is communicated to the influent pipe 14, but that the effluent pipe 15 is so connected with the flowing water that the velocity head of said flowing water is not communicated to effluent pipe 15. Then the head due to velocity of flow of the water to be measured is added to the static pressure in influent 14 and then communicated through the orifice 14' to the oil in container B, with the result that a small quantity of water is forced through orifice 14' into container B. This in turn forces a certain quantity of oil out of the container B through the orifice 13 into the container A and the water in the latter is forced out through the orifice 15'. The quantity of oil passing orifice 13, at all stages and rates of flow, is exactly proportioned to the various stages and rates of flow of the water being measured during corresponding periods. The gage 7 is first read at the height of the water when measuring is begun and finally when it is desired to ascertain a measurement of the flow. The size of the orifice 13, in the illustration, governs for the purpose of measurement. It will hence be observed that when the pressure of the velocity head begins, a small portion of water passing through the entrant 14' causes oil to rise through the orifice 13 in a pre-determined proportion to the water so entering and the oil passing to the upper part of the container A displaces an equal volume of water in the container A. It now becomes apparent that the rate of displacement of water in the container A as indicated by the gage 7 is a true indication of velocity of flow of the water being measured. Definite determination of said velocity can be obtained by experimental ratings of the device for containers and orifices of different sizes, and by this means the scale of the gage 7 will be established for any given size or arrangement of containers or orifices, so that a certain pre-determined unit of the scale will correspond with a unit of velocity of flow of the water being measured. With such scale established the conversion of velocity of flow of the water being measured into volume of flow is accomplished by applying a factor or multiplier dependent on the superficial area of a cross section of the water being measured.

I may use air instead of oil, or any suitable fluid. When oil, for example, is used, the purpose of the pipe 18 is to return it to the container B when the device is re-set for another measurement. The size of the containers is governed by the desired period of operation. The size of the controlling orifice 13 is governed by the size of the containers and period of operation. In the form shown in Fig. 3 the controlling orifice 13 is placed in the pipe 12, which is a convenient arrangement. It may however be where the orifices 14' and 15' are shown, but must always be the smallest one. The others are made small to prevent undesirable outflow when a fluid like oil is used. If it is desired to measure a fluid of light specific gravity, the arrangement as shown may be reversed and the transfer of the heavier fluid from the upper to the lower container accomplished in a like manner without departing from the principle of my device. The fundamental principle thereof is the application of the velocity head or pressure of the influent fluid and a resultant proportionate flow of this fluid or some other fluid from one container to the other whereby the total quantity of flow without can be proportionately pre-determined upon the gage with substantial accuracy for any given period. The device has the distinct advantage of freedom from working parts which may become broken or require frequent adjustment for successful operation.

Having described my invention I claim:—

1. A volumeter of the character described, comprising an upper container, a lower container, a vertical connection C between the containers, said connection having a diaphragm therein provided with an orifice the area of which is determined and fixed with relation to the size of said containers and period of operation, an influent pipe entering the connection C below its diaphragm, and an effluent pipe discharging from the said connection above the diaphragm, substantially as described.

2. A volumeter of the character described, comprising an upper container, a lower container, a vertical connection C between the containers, said connection having a diaphragm therein provided with an orifice, an influent pipe provided with an orifice entering the connection C below its diaphragm, an effluent pipe provided with an orifice discharging from the said connection above the diaphragm, one of the orifices mentioned having an area which is determined and fixed by the size of the containers and period of operation, one or both of the others having an area not less than that of the one so determined, and a gage on one of the containers, substantially as described.

3. A volumeter of the character described, comprising an upper container, a lower container, a vertical connection C between the containers, said connection having a diaphragm therein, a vertically movable pipe within the connection C passing through the diaphragm, said pipe having an orifice therein the area of which is determined with relation to the size of the said containers and period of operation, an influent pipe entering the connection C below its diaphragm, and an effluent pipe discharging from said connection above the diaphragm, substantially as described.

4. A volumeter of the character described, comprising an upper container, a lower container, a vertical connection C between the containers, said connection having a diaphragm therein, a vertically movable pipe within the connection C passing through the diaphragm, said pipe being provided with an orifice, an influent pipe provided with an orifice, entering the connection C below its diaphragm, an effluent pipe provided with an orifice discharging from said connection above the diaphragm, one of the orifices mentioned having an area which is determined and fixed by the size of the containers and period of operation, one or both of the others having an area not less than that of the one so determined, and a gage on one of the containers, substantially as described.

ERNEST G. HOPSON.

Witnesses:
 DELIA SMITH WRIGHT,
 ETHEL E. HOPSON.

Copies of this patent may be obtained for five cents each, by addressing the "Commissioner of Patents, Washington, D. C."